UNITED STATES PATENT OFFICE.

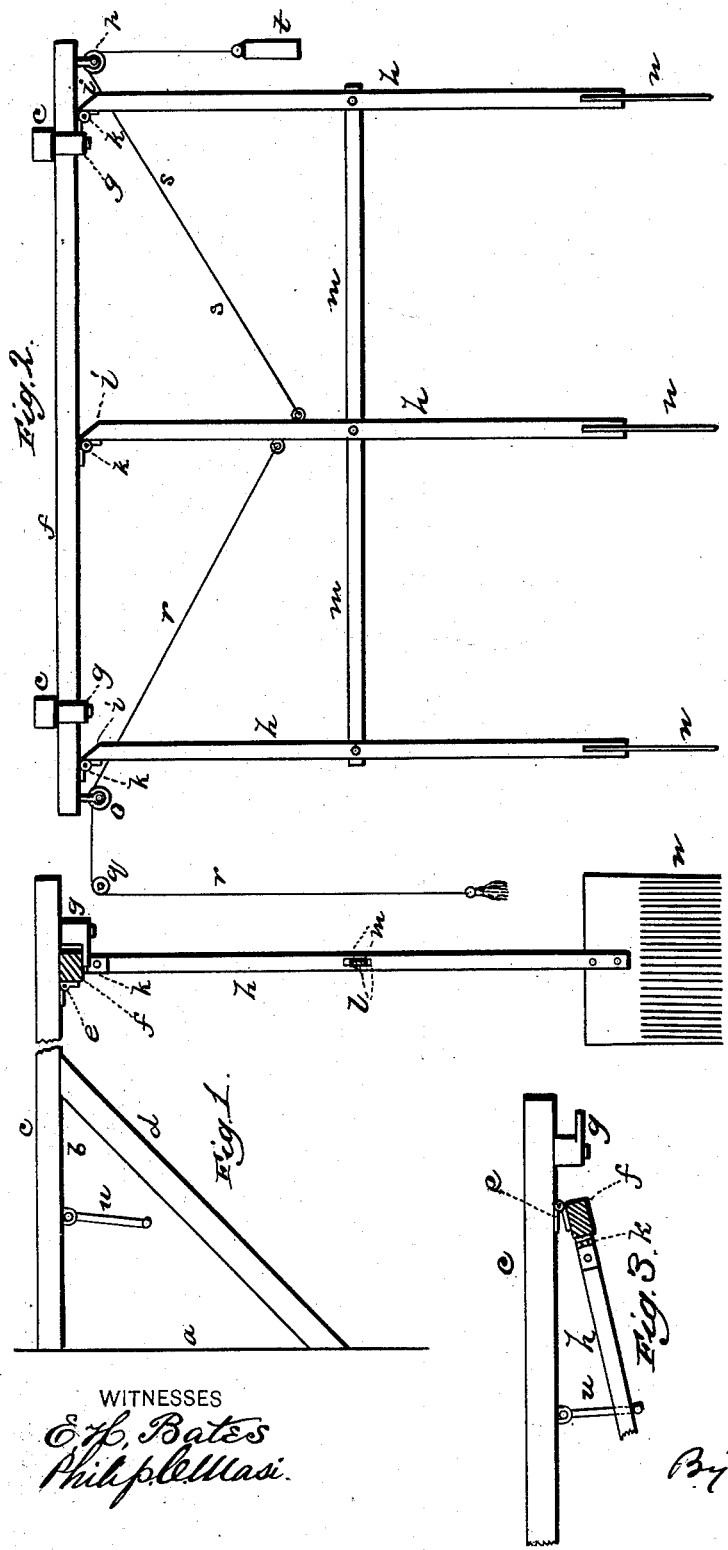

JOHN T. SCOTT, OF WASHINGTON, DISTRICT OF COLUMBIA.

SWINGING FAN.

SPECIFICATION forming part of Letters Patent No. 268,549, dated December 5, 1882.

Application filed July 13, 1882. (No model.)

*To all whom it may concern:*

Be it known that I, JOHN T. SCOTT, a citizen of the United States of America, residing at Washington, in the District of Columbia, have invented certain new and useful Improvements in Swinging Fans, of which the following is a specification, reference being had therein to the accompanying drawings.

Figure 1 is a front elevation; Fig. 2, a side elevation; Fig. 3, a detail view.

This invention has relation to swinging fans for butchers' and marketmen's use, and is intended to be erected over the stall or marketstand in such a position that when in use it may be operated to drive away the flies and cool the meat or other articles over which it works; and it consists in the construction and novel arrangement of parts, as will be hereinafter fully described, and particularly pointed out in the claim appended.

Referring by letter to the accompanying drawings, $a$ designates the frame or wall of the stall, to which the supporting-brackets $b$ are secured by nails, bolts, screws, or otherwise, said brackets consisting of the horizontal arms $c$ and the inclined braces $d$. Usually but two of the brackets $b$ are required; but more may be used, if desirable.

To the under face of the horizontal arms $c$, and near their forward extremities, is secured by hinges $e$ a cross-bar, $f$, which is held in place when the fan is in operation by buttons $g$ $g$, pivoted to the arms $c$ outside of the cross-bar $f$, as shown.

From the under face of the cross-bar $f$ depend the fan-arms $h$, which are beveled at $i$ upon their upper ends on the side away from the power which is applied to operate the fans, and are secured to said cross-bar $f$ by hinges $k$. Two, three, or more of these arms may be employed, according to the length of the stall to which the fan is to be attached. In the drawings, Fig. 2, three are shown. About midway of their length these arms $h$ are slotted laterally, as shown at $l$, for the reception of a connecting bar or rod, $m$, which is pivoted in the slots $l$, so as to permit the fan-arms $h$ to swing in unison when operated. Pins instead of slots, and a connecting-rope instead of the connecting-bar, may be used, if desired, to connect the fan-arms $h$; but I prefer the connecting-bar. The lower ends of the fan-arms $h$ are bifurcated for the reception of the fans $n$, which are secured therein by screws or otherwise, and may be of any pattern or design desired, these being placed over the bench of the stall at right angles to its length, and near enough the material upon the stand to drive away the flies when the fans are operated.

Near opposite ends of the cross-bar $f$, and from the under face thereof, pulleys $o$ and $p$ depend, and to the frame of the stall a third pulley, $q$, is attached.

Over the pulleys $o$ and $q$ the operating-rope $r$ passes, and is attached to the middle arm $h$, where three are used. Where two arms $h$ are used the rope passes the first arm and is connected to the second.

A rope, $s$, is attached to the middle arm $h$, or, where two arms only are used, to the arm $h$ nearest the operator, and runs over the pulley $p$, and is provided at its end with a weight, $t$, as shown.

To operate the fans the attendant, usually a boy, pulls upon the rope $r$, and draws the fans toward the end of the bench nearest to him, and elevates the weight $t$. As soon as he relaxes the force upon the rope $r$ the weight $t$ will descend and carry the fans in the opposite direction considerably beyond a vertical position. A repetition of this operation successively will drive away the flies, and where operated over fresh meats will cool them sufficiently to prevent sweating. When it is desired to dress the bench the fans can be turned up out of the way by disengaging the buttons $g$ $g$ and swinging the fans back and up, and securing by means of the hooks or buttons $u$ to the brackets.

By this construction I produce a cheap, simple, and efficient fan for butchers' and others' use.

The brackets may be suitably braced to strengthen them by top braces where required.

It is obvious that the swinging fan thus constructed may be erected over a bed, a diningtable, in a hospital ward, or in many other places—as, for instance, over a barber's chair—and yet conform to the construction.

Having fully described my invention, what I claim is—

In a swinging fan, the combination, with the brackets $b$, having arms $c$, of the hinged cross-bar $f$, buttons $g$, hinged fan-arms $h$, carrying fans at their lower ends, connecting-bar $m$, pulleys $o\ p\ q$, ropes $r$ and $s$, and weight $t$, substantially as specified.

In testimony whereof I have this 8th day of July, 1882, set my hand and affixed my seal in the presence of two witnesses.

JOHN T. SCOTT. [L. S.]

Witnesses:
 H. SANBORN,
 JOS. PHILLIPS.